(12) United States Patent
Chen et al.

(10) Patent No.: US 9,921,615 B2
(45) Date of Patent: Mar. 20, 2018

(54) COMPONENT CARRIER

(71) Applicant: Quanta Computer Inc., Taoyuan (TW)

(72) Inventors: Chao-Jung Chen, Taoyuan (TW); Yaw-Tzorng Tsorng, Taoyuan (TW); Kun-Pei Liu, Taoyuan (TW); Yi-Te Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 65 days.

(21) Appl. No.: 15/093,584

(22) Filed: Apr. 7, 2016

(65) Prior Publication Data
US 2017/0293325 A1 Oct. 12, 2017

(51) Int. Cl.
*G06F 1/18* (2006.01)
(52) U.S. Cl.
CPC ...................... *G06F 1/18* (2013.01)
(58) Field of Classification Search
CPC . G06F 1/18; G06F 1/187; G06F 1/184; G06F 1/1658; G11B 33/124; G11B 33/128; G11B 33/022
USPC ........................... 361/679.33, 679.37, 679.58
See application file for complete search history.

(56) References Cited

U.S. PATENT DOCUMENTS

| | | | | |
|---|---|---|---|---|
| 6,952,341 B2* | 10/2005 | Hidaka | ................ | G11B 33/128 312/332.1 |
| 7,262,958 B2* | 8/2007 | Marroquin | .............. | G06F 1/187 312/223.2 |
| 8,582,287 B2* | 11/2013 | Nguyen | ................... | G06F 1/187 211/126.6 |
| 8,807,488 B2* | 8/2014 | Lee | ......................... | G06F 1/187 248/222.51 |
| 2005/0051672 A1* | 3/2005 | Dean | ....................... | G06F 1/184 248/27.1 |
| 2015/0123519 A1* | 5/2015 | Chen | ....................... | G06F 1/187 312/223.2 |
| 2015/0327414 A1* | 11/2015 | Jau | ..................... | H05K 13/0084 206/701 |

FOREIGN PATENT DOCUMENTS

TW 1486951 B 6/2015

OTHER PUBLICATIONS

Taiwanese Office Action for Application No. 105116165, dated Jan. 5, 2017, w/ First Office Action Summary.

* cited by examiner

*Primary Examiner* — Patrick D Hawn
(74) *Attorney, Agent, or Firm* — Nixon Peabody LLP; Eduardo J. Quinones

(57) ABSTRACT

A component carrier with a tray, a slide cage, a level, and a tilting mechanism. The tray has a bottom surface with a groove formed therein. The slide cage is actuatably coupled with the tray and has a receiving space and an undercarriage. The lever is pivotally coupled with the slide cage and has a lower portion for engaging the groove to transition the slide cage between a first position and a second position. The tilting mechanism is coupled with the tray and configured for biasing the slide cage to the second position. In the first position the undercarriage of the slide cage is positioned proximal to the bottom surface of the tray. In the second position a first end portion of the undercarriage of the slide cage is displaced away from the bottom surface and a second end portion is positioned proximal to the bottom surface of the tray.

17 Claims, 6 Drawing Sheets

COMPONENT CARRIER

FIELD OF THE INVENTION

The present disclosure relates to a component carrier, more specifically the present disclosure relates to a bracketless component carrier.

BACKGROUND

Component carriers designed to secure components provide bulk and often prevent easy decoupling of the component from the component carrier. Component carries often require a bracket coupled to the component to be received within the component carry preventing the insertion and removal of bare components into the component carrier.

SUMMARY OF THE INVENTION

A component carrier including a tray having a bottom surface with a groove formed therein. The slide cage actuatably coupled with the tray and having a receiving space and an undercarriage. A lever pivotally coupled with the slide cage and having a lower portion for engaging the groove to transition the slide cage between a first position and a second position. A tilting mechanism coupled with the tray and biased to the second position. In the first position, the undercarriage of the slide cage is positioned proximal to the bottom surface of the tray. In the second position, at least a first end portion of the undercarriage is displaced away from the bottom surface and a second end portion is positioned proximal to the bottom surface of the tray. The tilt mechanism and slide cage can be spring biased toward the second position.

The tray can also include a partition disposed at a front portion of the tray and having a groove formed within the partition. A protrusion formed on the front portion of the slide cage is received in the groove. The groove can be substantially L-shaped thereby having a vertical portion adjacent to the front portion of the tray and a horizontal portion toward the rear of the tray. In the first position the protrusion on the slide cage is disposed in the horizontal portion of the substantially L-shaped groove, and in the second position the protrusion on the slide cage is disposed in the vertical portion of the substantially L-shaped groove. The vertical portion of the substantially L-shaped groove is configured to vertically displace the front portion of the slide cage and the respective component received therein.

The tray can have a flange disposed opposite the partition with the flange having a track formed therein substantially parallel to the bottom surface of the tray. The slide cage can have at least one shorter pin configured to be slidingly received within the track. The track formed in the flange can be orientated parallel to a length of the slide cage and have a front portion and a rear portion. In the first position the shorter pin is disposed at the front portion of the track and in the second position the shorter pin is disposed at the rear portion.

The slide cage can also include a latch couplable with the lever and transitionable between an unlatched position and a latched position. The latched position resists pivoting of the lever away from the first position.

BRIEF DESCRIPTION OF THE DRAWINGS

Various embodiments in accordance with the present disclosure will be described with reference to the drawings, in which.

DETAILED DESCRIPTION

Figure 1:
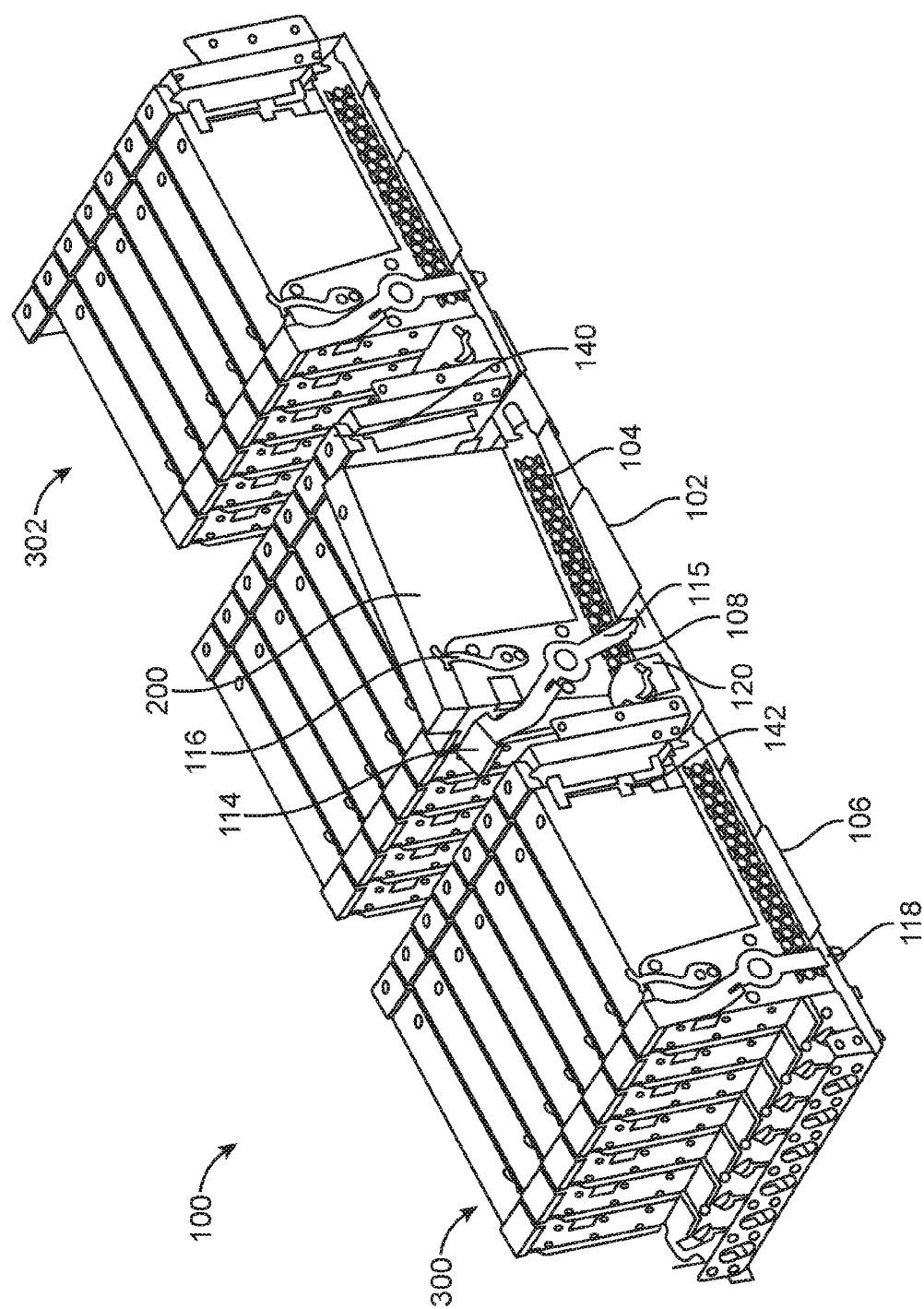
FIG. 1 is an isometric view of a component carrier with a plurality of slide cages in accordance with an example embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "adjacent" means next to or near, but having a definitive separation. The term "proximal" means situated nearer to the center of the body, surface, or point of attachment, such that something that is proximal surface is nearer to a surface, body, or point of attachment than an adjacent surface. The term "actuatable" and/or "actuatably" is defined as capable of inciting action, movement including, but limited to, pivoting, rotating, lateral displacement, and vertical displacement. The term "comprising" means "including, but not necessarily limited to"; it specifically indicates open-ended inclusion or membership in a so-described combination, group, series and the like.

The present disclosure relates to a component carrier having a tray. The tray having a bottom surface and configured to receive one or more slide cages. The slide cage is actuatably coupled with the tray and configured to receive a component. The slide cage has an undercarriage adjacent to the bottom surface of the tray. A lever is pivotally coupled with the slide cage and configured to transition the slide cage between a first position and a second position. A groove formed on the tray receives a lower portion of the lever with the lower portion of the lever configured to engage the groove to transition the slide cage between the first position and the second position. In the first position, the undercarriage of the slide cage is proximal to the bottom surface of the tray. In the second position, at least a portion of the undercarriage of the slide cage is displaced away from the bottom surface of the tray so as to not be proximal to the bottom surface of the tray.

While the following figures are drawn to an embodiment configured to receive and secure one or more hard disk drives within the component carrier, it is within the scope of this disclosure to implement the component carrier with other components including, but not limited to, solid state drives, optical drives, video cards, power supplies, fans, or any other component of an electronic device.

Figure 2:
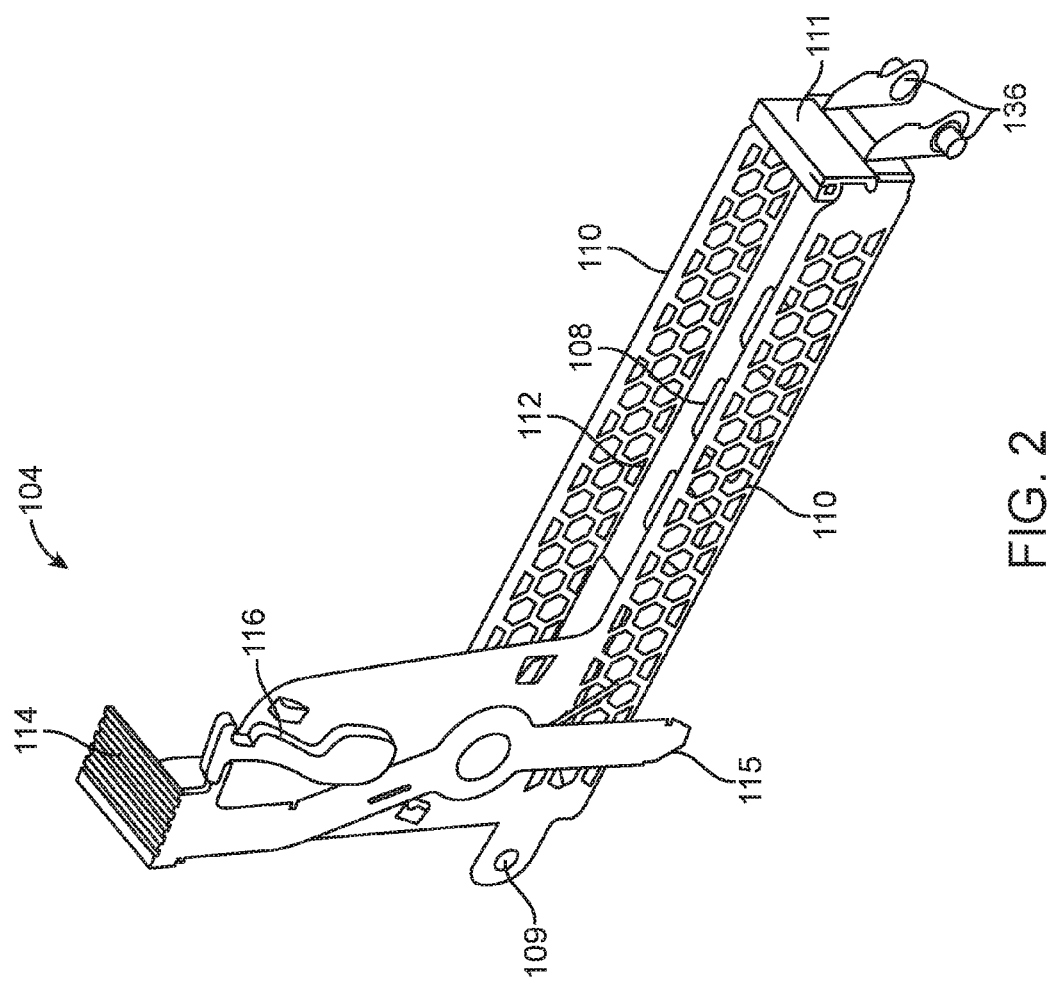
FIG. 2 is an isometric view of a slide cage in accordance with an example embodiment.
Figure 3:
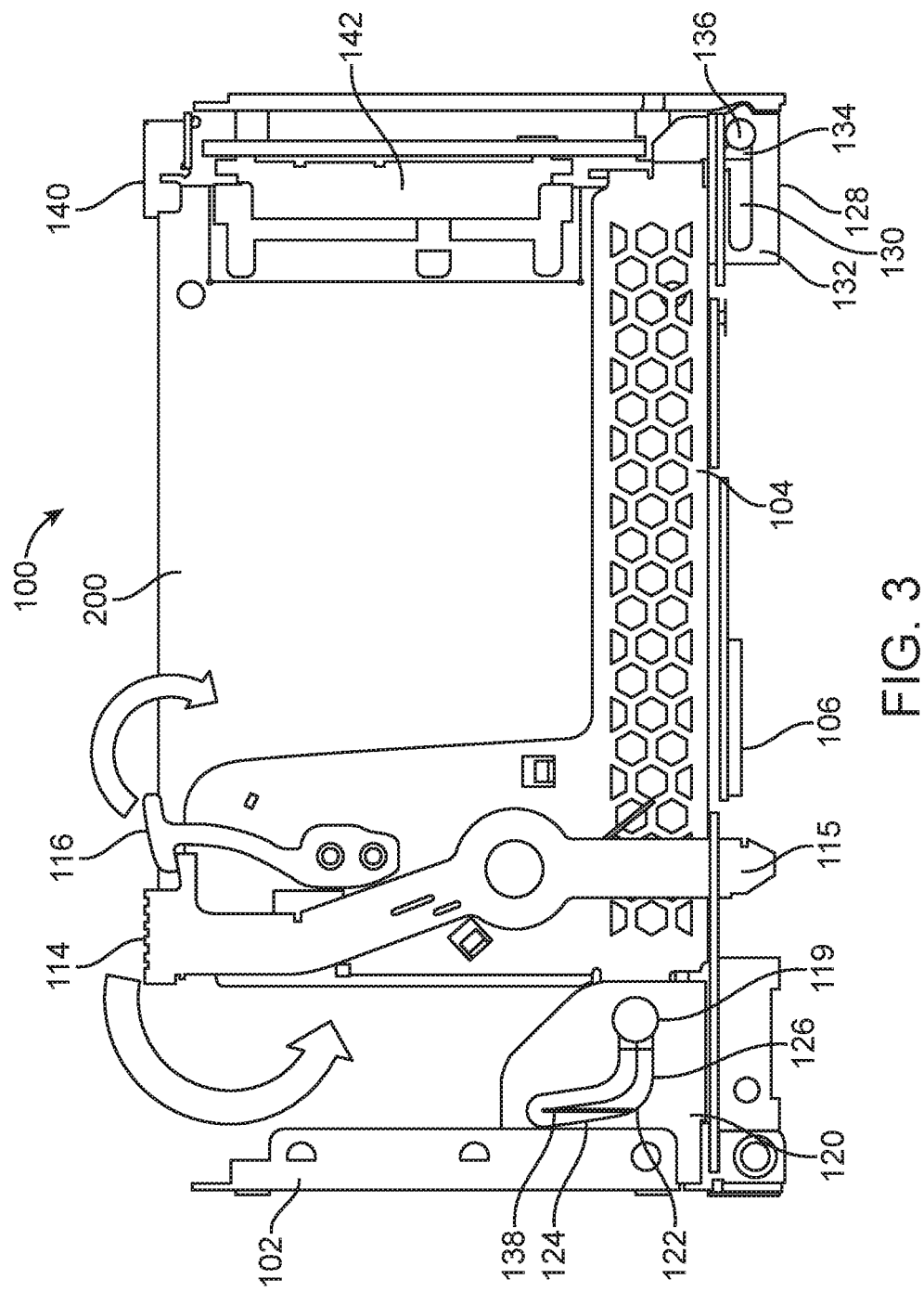
FIG. 3 is an elevational view of a component carrier in a first position in accordance with an example embodiment.
Figure 4:
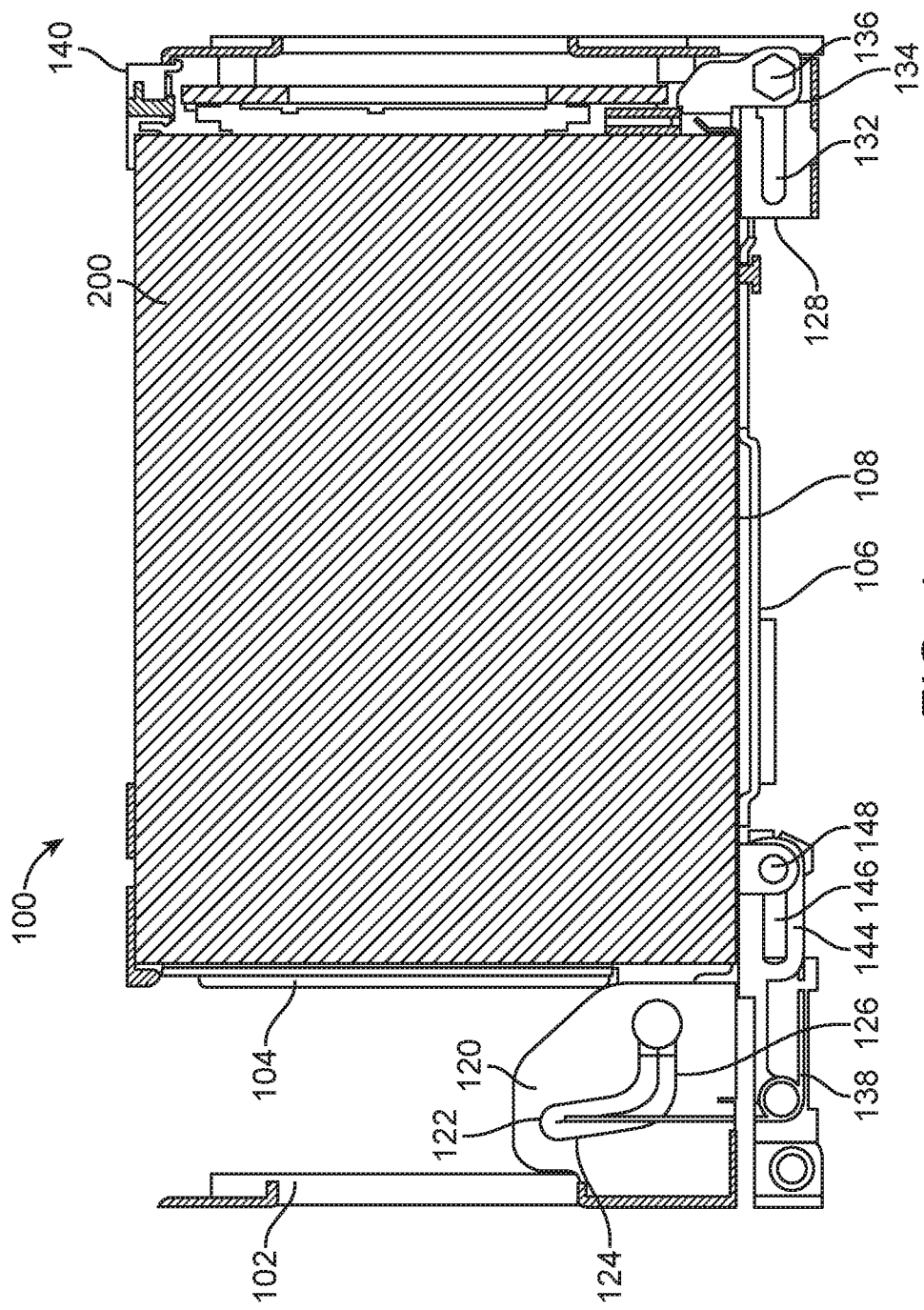
FIG. 4 is a section view of a component carrier in a first position in accordance with an example embodiment.
Figure 5:
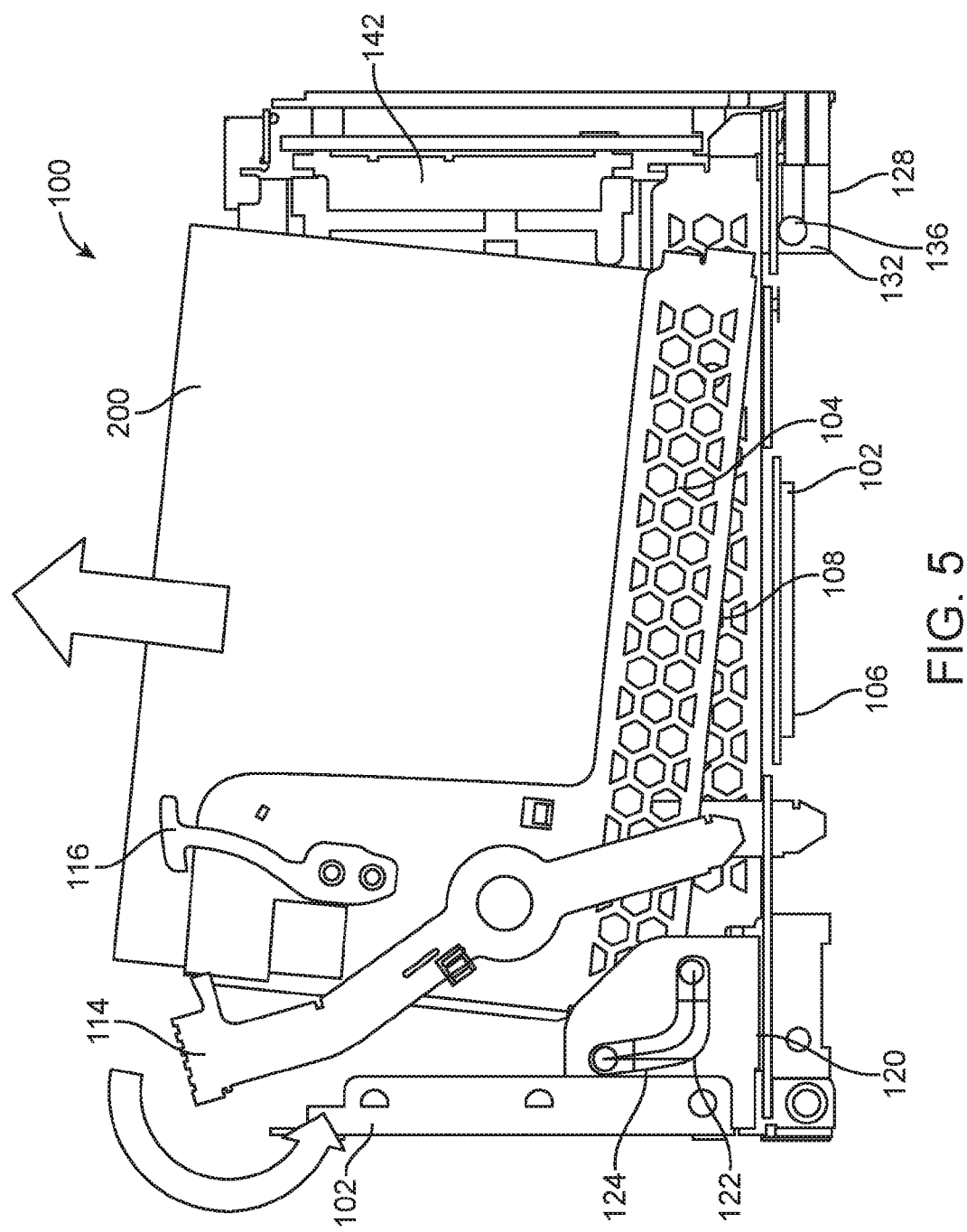
FIG. 5 is an elevational view of a component carrier in a second position in accordance with an example embodiment.
Figure 6:
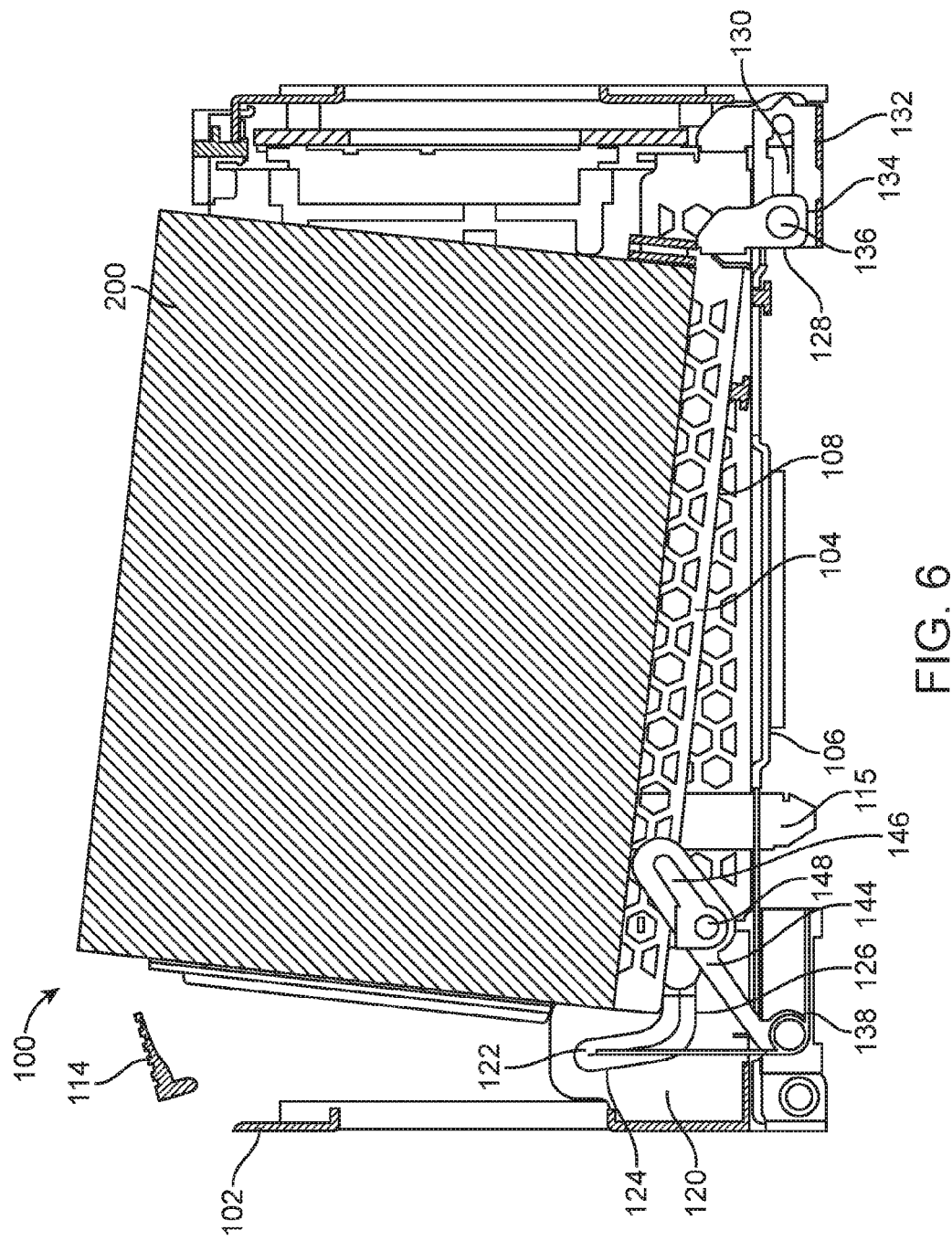
FIG. 6 is a section view of a component carrier in a second position.

The present disclosure now turns to FIGS. 1-6, in which an exemplary configuration of a component carrier 100 in accordance with the present technology is illustrated. FIG. 1 shows an isometric view of the component carrier 100 with a plurality of slide cages 104. FIG. 2 is an isometric view of the slide cage 104. FIGS. 3 and 4 are elevational and section views of the component carrier 100, respectively, with the slide cage 104 in a first position. FIGS. 5 and 6 are elevational and section views of the component carrier 100, respectively, with the slide cage 104 in a second position.

FIG. 1 illustrates the component carrier 100 having a tray 102 receiving a plurality of slide cages 104. The tray 102 can receive slide cages 104 in a matrix arrangement of rows and columns to maximize the number of slide cages 104 a component carrier 100 receives. However, the present disclosure contemplates that other arrangements can be used without limitation. The tray 102 has a bottom surface 106 and is configured be coupled with one or more slide cages 104. The slide cage 104 is coupled with the tray 102 and can receive a component 200. In the illustrated embodiment, the component 200 is shown as a hard disk drive, but other components can be implemented without departing from the scope of the disclosure.

The slide cage 104 is actuatably coupled with the tray 102 allowing lateral displacement of the slide cage 104 and pivoting of the slide cage 104 relative to the tray 102. The slide cage 104 has an undercarriage 108 and is arranged with respect to the tray 102 so that the undercarriage 108 is facing or adjacent to the bottom surface 106 of the tray 102.

As shown in FIG. 2, the slide cage 104 can have one or more sidewalls 110 to define receiving space 112 to receive the component 200. The slide cage 104 can also include a lever 114 that can be pivotally coupled with the slide cage 104. The lever 114 can be configured to transition the slide cage 104 between a first position and a second position, as discussed in further detail below. The lever 114 can have a lower portion 115 configured to be received within a groove 118 formed on the tray 102. The lower portion 115 of the lever 114 can engage the groove 118 to transition the slide cage 104 between the first position and the second position. The lever 114 can be secured in the first position by a latch 116. The latch 116 can be pivotally coupled with the slide cage 104 and transitionable so as to restrict pivoting of the lever 114 when the slide cage 104 is in the first position, as discussed below.

As shown in FIGS. 4 and 6, the slide cage 104 can include a tilting mechanism 144 pivotally coupled with the tray 102 and biasing element 138 configured to bias the slide cage 104 and tilting mechanism 144 toward the second position. In at least one embodiment, the biasing element 138 is a spring. In other embodiments, the biasing element 138 can be any elastic member configured to urge the slide cage 104 to the first position absent other forces.

The tilting mechanism 144 have a guideway 146 formed therein to receive the front shorter pins 148. The guideway 146 extends along the length of the tilting mechanism and actuates the slide cage 104 in conjunction with the lever 114 between the first position and the second position. The tilting mechanism 144 and guideway 146 can extend substantially parallel to the tray 102 in the first position and the spring 138 elevates the tilting mechanism 144 in the second position. The guideway 146 in the second position is angled relative to the bottom surface 106 of the tray 102. As the biasing element 138 elevates the tilting mechanism 144, the front shorter pin 148 slides within the guideway 146 from a substantially rearward position to a substantially forward position. The translation of the front shorter pin 148 within the guideway 146 causes a lateral displacement of the slide cage 104 and a rotation of the slide cage 104.

As noted above, the slide cage 104 can transition between a first position and a second position with respect to the tray 102. FIGS. 3 and 4 illustrate the slide cage in the first position, as noted above. The lever 114 and latch 116 can be configured to compress the biasing element 138 upon actuation, thereby securing the slide cage 104 in the first position.

In the first position, the undercarriage 108 of the slide cage 104 is proximal to the bottom surface 106 of the tray 102. The undercarriage 108 and the bottom surface 106 can be touching, such as in a flush arrangement, or have a minimal gap therebetween to provide for appropriate tolerance during transitioning between the first position and the second position. The lever 114 secures the component 200 within the slide cage 104 such that the component 200 cannot be removed from the receiving space 112. The tray 102 can also have a component knob 140 to engage the component 200 opposite the lever 114. The component knob 140 can engage a top surface 204 of the component 200 to secure the component 200 within the slide cage 104 and the receiving space 112. In the first position, the undercarriage 108 and the bottom surface 106 can be substantially parallel to one another. In FIG. 1, the first position is illustrated by the slide cages 104 in the front row 300 and the rear row 302.

In the second position, a first end portion 109 of the undercarriage 108 of the slide cage 104 is displaced away from the bottom surface 106 of the tray 102. The first end portion 109 is not proximal to the bottom surface 106 of the tray 102. The slide cage 104 angled relative to the bottom surface 104 of the tray 102 causing the first end portion 109 to be above the tray 102 by a larger distance than in the first position. The pivoting of the lever 114 and the displacement of the slide cage 104 allow for insertion and removal of the component 200 from the receiving space 112. In FIG. 1, the second position is illustrated by the nearest slide cage 104 in the middle row 304. The second position is seen more clearly in FIGS. 5 and 6.

The tray 102 can include a partition 120 having a groove 122 formed therein. The groove 122 can be substantially L-shaped and have a vertical portion 124 and horizontal portion 126. The groove 122 receives a protrusion 119 formed on the front portion 109 of the slide cage 104. The protrusion 119 can slide within the groove 122 as the slide cage 104 transitions between the first position and the second position. The partition 120 guides the slide cage 104 as it transitions by guiding the protrusion 119 within the groove 122. The partition 120 is formed adjacent to the portion of the slide cage 104 to be elevated in the second position and guide both lateral and vertical displacement.

The tray 102 can have a component flange 128 formed opposite the partition 120. The flange 128 can have a track 130 formed therein and the track 130 can be substantially parallel to the bottom surface 106 of the tray 102. The track 130 can have a front portion 132 and a rear portion 134 and be configured to receive a shorter pin 136 disposed on the slide cage 104. The shorter pin 136 can slide within the track 130 as the slide cage 104 transitions between the first position and the second position. The flange 128 guides the slide cage 104 as it transitions by guiding shorter pin 136 within the track 130. The flange 128 is formed adjacent to the portion of the slide cage 104 that remains proximal to the bottom surface 106, thereby guiding only lateral displacement of the slide cage 104.

FIG. 2 illustrates a slide cage 104 of a component carrier 100 having sidewalls 110 forming a receiving space 112. The slide cage 104 has two vertically extending sidewalls 110 and a rear wall 111 enclosing the receiving space 112. The sidewalls 110 and the rear wall 111 can extend vertically from the undercarriage 108. The receiving space 112 is configured to receive a component 200 (shown in FIG. 1). At least one of the sidewalls 110 can extend sufficiently vertical to allow a pivotal coupling with the lever 114 and latch 116. As can be appreciated in FIG. 2, the sidewalls 110 can have a honeycomb arrangement to increase airflow into and around the receiving space 112 and reduce the weight of the slide cage 104. As can further be appreciated in FIG. 2, the protrusion 119 extends from the first end portion 109 of the slide cage 104 and the shorter pins 136 extend from the second end portion and adjacent to the rear wall 111.

FIG. 3 illustrates the component carrier 100 having a slide cage 104 in a first position. The slide cage 104 undercarriage 108 is substantially parallel with the bottom surface 106 of the tray 102. The undercarriage 108 and the bottom surface 106 are proximal to one another and the lever 114 secures the component 200 within the receiving space 112. The latch 116 prevents actuation of the lever 114, thereby securing the component carrier in the first position. The protrusion 119 is disposed in the horizontal portion 126 of the substantially L-shaped groove 122 formed in the partition 120. The shorter pin 136 is disposed at the rear portion 134 of the track 130 formed in the component flange 128.

As can be appreciated in FIG. 3, the tray 102 can have an electrical coupler 142 configured to electronically couple the component 200 via the connector 202. The electrical coupling between the component 200 and the tray 102 can vary depending on the component 200 being implemented. The electrical coupler 142 can be a Serial ATA, Universal Serial Bus, Firewire, or any other known electrical coupler 142 known in the art.

FIG. 4 illustrates a section view of the component carrier 100 in the first position. The spring bias 138 is shown disposed at the front portion 109 of the slide cage 104. The spring bias 138 biasing the slide cage 104 toward the second position. The spring bias 138 can engage a tilting mechanism 144 disposed below the partition 120. The tilt mechanism 144 can have a guideway 146 formed therein to receive a front shorter pin 148. The tilting mechanism 144 can pivot relative to the slide cage 104 between the first and second position, such that in the first position the tilt mechanism 144 and guideway 146 are substantially parallel to the bottom surface 106 of the tray 102 and in the second position the tilt mechanism 144 and guideway 146 are angled relative to the bottom surface 106.

As can be appreciated in FIGS. 3-5, the component carrier 100 can be transitioned from the first position to the second position by pivoting the latch 116 away from the lever 114 in a clockwise direction. After releasing the latch 116, the lever 114 can be pivoted in a counter-clockwise direction. As the lever 114 is pivoted, the lower portion 115 of the lever 114 engages the grove 118 formed on the tray 102 and the protrusion 119 transitions with the substantially L-shaped groove 122 from the horizontal portion 126 toward the vertical portion 124. The movement of the protrusion 119 from the horizontal portion 126 to the vertical portion 124 laterally and vertically displaces the slide cage 104 relative to the tray 102. The shorter pin 136 simultaneously moves within the track 130 from the rear portion 134 toward the front portion 132. The track 130 remains substantially parallel to the bottom surface 106 of the tray causing the front portion 109 of the slide cage 104 to vertically displace relative to the tray while the rear portion of the slide cage 104 is only laterally displaced.

FIGS. 5 and 6 illustrate the component carrier 100 in the second position. The component 200 can be received into and removed from the slide cage 104. The lateral displacement of the slide cage 104 between the first position and the second position couples and/or decouples the component 200 from the electrical coupler 142. As can be appreciated in FIG. 5, the protrusion 119 is disposed in the vertical portion 124 of the substantially L-shaped groove 122 and the lower portion 115 of the lever 114 is removed from the groove 118. The vertical displacement of the front portion 109 of the slide cage 104 allows for easy removal and receiving of the component 200 away from and into the slide cage 104. The lateral displacement of the slide cage 104 disengages the component knob 140 from the top surface 204 of the component 200.

The slide cage 104 can be transitioned from the second position to the first position by applying a downward force onto the component 200 to overcome the spring bias 138 and engage the lower portion 115 of the lever 114 within the groove 118. The lever 114 can then be pivoted in a clockwise direction to secure the component 200 under the component knob 140 and within the receiving space 112. The lever 114 can be secured in the first position by pivoting the latch 116 in a counter-clockwise direction. As can be appreciated in FIG. 6, the tilting mechanism 144 is vertically displaced thereby elevating the slide cage 104 above the bottom surface 106 of the tray 102.

What is claimed is:

1. A hard drive carrier comprising:
    a hard drive tray having a bottom surface, the bottom surface having a groove formed therein;
    a slide cage actuatably coupled with the hard drive tray and having a receiving space and an undercarriage;
    a lever pivotally coupled with the slide cage and having a lower portion for engaging the groove to transition the component slide cage between a first position and a second position;
    a tilting mechanism coupled with the hard drive tray and configured for biasing the slide cage to the second position,
    wherein in the first position the undercarriage of the slide cage is positioned proximal to the bottom surface of the hard drive tray;
    wherein in the second position a first end portion of the undercarriage of the slide cage is displaced away from the bottom surface and a second end portion is positioned proximal to the component tray;
    wherein the hard drive tray includes a partition having a substantially L-shaped groove formed therein, the groove receiving a protrusion extending from the slide cage and translating within the groove to guide the slide cage between the first position and the second position.

2. The hard drive carrier of claim 1, wherein the hard drive tray further comprises a flange disposed opposite the partition, the flange having a track formed therein substantially parallel to the bottom surface of the tray and the slide cage has at least one shorter pin configured to be slidingly received within the track and guide the slide cage between the first position and the second position.

3. A component carrier comprising:
a tray having a bottom surface, the bottom surface of the tray having a groove formed therein;
a slide cage actuatably coupled with the tray and having a receiving space and an undercarriage;
a lever pivotally coupled with the slide cage and having a lower portion for engaging the groove to transition the slide cage between a first position and a second position;
a tilting mechanism coupled with the tray and configured for biasing the slide cage to the second position;
wherein the tray includes a partition having a groove formed therein;
wherein the slide cage includes a protrusion formed on the first end portion of the slide cage, and wherein the protrusion is received within the groove;
wherein the tray has a flange having a track formed therein substantially parallel to the bottom surface of the tray, the slide cage having at least one shorter pin at the second end portion configured to be slidingly received within the track;
wherein in the first position the undercarriage of the slide cage is positioned proximal to the bottom surface of the tray;
wherein in the second position a first end portion of the undercarriage of the slide cage is displaced away from the bottom surface and a second end portion is positioned proximal to the bottom surface of the tray.

4. The component carrier of claim 3, wherein the tilting mechanism has a guideway formed therein, wherein the slide cage includes a front short pin formed on the undercarriage of the first end portion of the slide cage and wherein the protrusion is received within the guideway.

5. The component carrier of claim 3, wherein the groove formed in the partition is substantially L-shaped with a horizontal portion extending towards the first end portion of the slide cage.

6. The component carrier of claim 5, wherein in the first position the protrusion on the slide cage is disposed in the horizontal portion of the substantially L-shaped groove, and in the second position the protrusion is disposed in the vertical portion of the substantially L-shaped groove.

7. The component carrier of claim 5, wherein the vertical portion of the substantially L-shaped groove is configured to vertically displace the front portion of the slide cage in the first position.

8. The component carrier of claim of claim 3, wherein the track formed in the flange is orientated parallel to a length of the slide cage and has a front portion and a rear portion, in the first position the shorter pin is disposed at the front portion of the track and in the second position the shorter pin is disposed at the rear portion.

9. The component carrier of claim 3, wherein the slide cage includes a latch couplable with the lever and transitionable between an unlatched position and a latch position, the latched position resists pivoting of the lever away from the first position.

10. The component carrier of claim 3, wherein a tilting element pivotally coupled with the tray is biased to the second position by a spring.

11. The component carrier of claim 3, wherein the lever secures the component to the slide cage in the first position.

12. The component carrier of claim 3, wherein the receiving space is accessible to receive a component in the second position as the first end portion of the undercarriage of the slide cage is displaced away from the bottom surface.

13. The component carrier of claim 3, wherein the slide cage has two sidewalls vertically extending from the undercarriage forming the receiving space.

14. The component carrier of claim 3, wherein the tray includes a component knob disposed at a rear portion and configured to engage at least a portion of a hard drive in the receiving space.

15. A component carrier comprising:
a tray having a bottom surface, the bottom surface of the tray having a groove formed therein;
a slide cage actuatably coupled with the tray and having a receiving space and an undercarriage;
a lever pivotally coupled with the slide cage and having a lower portion for engaging the groove to transition the slide cage between a first position and a second position;
a tilting mechanism coupled with the tray and configured for biasing the slide cage to the second position,
wherein the tilting mechanism has a guideway formed therein;
wherein the slide cage includes a front short pin formed on the undercarriage of the first end portion of the slide cage;
wherein the protrusion is received within the guideway;
wherein in the first position the undercarriage of the slide cage is positioned proximal to the bottom surface of the tray;
wherein in the second position a first end portion of the undercarriage of the slide cage is displaced away from the bottom surface and a second end portion is positioned proximal to the bottom surface of the tray.

16. A component carrier comprising:
a tray having a bottom surface, the bottom surface of the tray having a groove formed therein;
a slide cage actuatably coupled with the tray and having a receiving space and an undercarriage;
a lever pivotally coupled with the slide cage and having a lower portion for engaging the groove to transition the slide cage between a first position and a second position;
a tilting mechanism coupled with the tray and configured for biasing the slide cage to the second position;
wherein the receiving space is accessible to receive a component in the second position as the first end portion of the undercarriage of the slide cage is displaced away from the bottom surface;
wherein in the first position the undercarriage of the slide cage is positioned proximal to the bottom surface of the tray;
wherein in the second position a first end portion of the undercarriage of the slide cage is displaced away from the bottom surface and a second end portion is positioned proximal to the bottom surface of the tray.

17. A component carrier comprising:
a tray having a bottom surface, the bottom surface of the tray having a groove formed therein;
a slide cage actuatably coupled with the tray and having a receiving space and an undercarriage;
a lever pivotally coupled with the slide cage and having a lower portion for engaging the groove to transition the slide cage between a first position and a second position;

a tilting mechanism coupled with the tray and configured for biasing the slide cage to the second position;

wherein the tray includes a partition having a groove formed therein;

wherein the slide cage includes a protrusion formed on the first end portion of the slide cage, and wherein the protrusion is received within the groove;

wherein the groove formed in the partition is substantially L-shaped with a horizontal portion extending towards the first end portion of the slide cage;

wherein in the first position the undercarriage of the slide cage is positioned proximal to the bottom surface of the tray;

wherein in the second position a first end portion of the undercarriage of the slide cage is displaced away from the bottom surface and a second end portion is positioned proximal to the bottom surface of the tray.

\* \* \* \* \*